FIG. 2A.

Nov. 4, 1958    C. E. JONES    2,858,919
TORQUE LIMITING CLUTCHES
Filed Oct. 4, 1955    10 Sheets—Sheet 6

INVENTOR
Charles Edward Jones
BY
Pennie, Edmunds,
Morton, Barrows & Taylor
ATTORNEYS Nov. 4, 1958  C. E. JONES  2,858,919
TORQUE LIMITING CLUTCHES
Filed Oct. 4, 1955  10 Sheets-Sheet 8

INVENTOR
Charles Edward Jones
BY
Pennie, Edmonds, Morton, Barrows & Taylor
ATTORNEYS Nov. 4, 1958

C. E. JONES 2,858,919

TORQUE LIMITING CLUTCHES

Filed Oct. 4, 1955

INVENTOR
Charles Edward Jones
BY
ATTORNEYS

FIG. 12

United States Patent Office 2,858,919
Patented Nov. 4, 1958

2,858,919

TORQUE LIMITING CLUTCHES

Charles Edward Jones, Bradford, England, assignor to Jones, Tate & Co., Ltd., Bradford, England, a British company Application October 4, 1955, Serial No. 538,467

Claims priority, application Great Britain October 13, 1954

12 Claims. (Cl. 192—85)

This invention relates to torque limiting clutches of the kind including relatively movable driving and driven members with respective teeth arranged to intermesh and so shaped that the driving force tends by acting against a biasing force to effect relative motion of the members and unmeshing of the teeth. When in such clutches the biasing force is provided by a solenoid, the clutch may be remotely controlled to render it effective or ineffective to drive and desirable relationship is obtainable between the biasing force or effort and relative movement of the members to effect intermeshing of the teeth. However, the use of electrical equipment is sometimes undesirable, for example, when such use is accompanied by explosion hazards unless recourse is had to flameproof enclosure means which tend to be expensive and somewhat complicated.

An object of the invention is the provision of a torque limting clutch which, without the use of a solenoid, may be rendered effective or ineffective to drive and may be remotely controlled.

A further object of the invention is the provision of a non-electrical power unit, including a torque limiting clutch, suitable for effecting operation of a valve or the like device.

Further objects and advantages of the invention will be apparent from the subsequent description of embodiments of the invention.

The invention will now be described, by way of example, with reference to the accompanying partly diagrammatic drawings, in which.

Referring first to the embodiment of the invention shown in Figures 1 to 6, 12 and 13, a main valve 1 of the parallel slide type is provided with an operating spindle 2 to which is secured a crosshead 3 having concave arcuate end parts 3a which respectively slidably engage two upright pillars 4a, 4d mounted on the upper part of the body of the valve 1 so that the operating spindle 2 is held against rotation although free to slide axially to effect opening or closing of the main valve. An upper end part 2a of the operating spindle 2 is in the form of an upright right-hand-screw-threaded part which extends into a pneumatic valve operating unit 10 secured to the upper ends of the two pillars 4a, 4d and of two similar pillars 4b, 4c.

The valve operating unit 10 includes a base plate 11 fitted over screw-threaded upper parts 4x of the pillars 4a, 4b, 4c and 4d and clamped by nuts 12 against upwardly facing shoulders 13 formed on the pillars. The upper surface of the base plate 11 is formed with an upwardly extending annular boss 14 having a bore 15 arranged coaxially with the operating spindle 2 and provided with a bush 16 into which rotatably fits the lower end of a cylindrical hub part 17a of a driven spider 17 provided with an axial bore 18 formed with a keyway 19, a key 20 locking the spider 17 to a nut member 21 formed with a screw-threaded axial bore 22 which operatively engages the upper end part 2a of the operating spindle 2.

The nut member 21 is formed at its lower end with an enlargement 30 presenting an upwardly facing shoulder 31 which engages the lower race 32 of a ball thrust bearing 33 and, when the spider 17 is rotated so as to force the operating spindle 2 downwardly through the nut member, forces the upper race 34 of bearing 33 against a downwardly facing shoulder 35 in a downward extension of the bore 15. A sealing ring 36 screw-threaded into the lower end of the bore 15 protects the bearing 33 against the ingress of dirt. Downward movement of the nut member 21 through the spider 17 is prevented by a ring 38 screwed on to a screw-threaded intermediate part 21a of member 21 and engaging an upwardly facing annular surface 39 of the spider. Upon an upper part of the nut member 21 is rotatably mounted a spoked handwheel 45 secured by a cap nut 46 screw-threaded onto the upper end of the member 21. Boss 48 of handwheel 45 is stepped to provide a downwardly facing shoulder 50 which normally abuts upon an annular flange 51 of a cast bridge piece 52 formed with horizontal portions 53 (see Figure 3) clamped by nuts 54 against upwardly facing shoulders on four pillars, of which two are shown at 55 in Figure 2A, mounted on the top of base plate 11.

Mounted on the upper end of the downwardly extending hub part 17a of the spider 17 is a cylindrical bearing sleeve 60 formed at its lower end with a radial flange 61 arranged to rest upon the top of boss 14, and the hub 62a of a spur gear wheel 62 fits over the sleeve 60 with its lower end resting on the upper surface of the flange 61. An upwardly facing surface 63 of the gear wheel 62 abuts against a downwardly facing bearing surface 64 of the spider 17.

Figure 5:
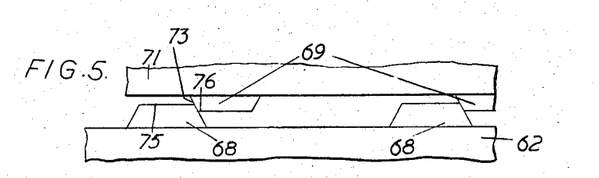
Figure 5 is a front elevation of driving and driven teeth of a torque limiting clutch incorporated in the valve actuating gear of Figure 1.

The upper surface of the gear wheel 62 is formed, adjacent the wheel periphery, with a circular row of upwardly extending clutch teeth 68, the form of which is shown in Figure 5. Arranged opposite the teeth 68 is a set of complementary clutch teeth 69 formed on and depending from a spur gear wheel 71. As shown in Figure 5, each tooth 68 and 69 has leading and trailing edge surfaces 73 which are inclined inwardly of the tooth in a direction away from the gear wheel 62 or 71 upon which the tooth is provided, so that in whichever direction gear wheel 62 is driven, the reaction between the teeth tends to separate the driven member, gear wheel 71 from the driving member, gear wheel 62, so that flat crown portions 76 on teeth 69 may ride over corresponding flat crown portions 75 on teeth 68. The gear wheel 62 and the gear wheel 71 serve respectively as driving and driven clutch members.

The gear wheel 71 is formed with several radial slots, such as the slots 80, and flat lugs 81 which extend radially and upwardly from the spider 17 extend upwardly through these slots, the arrangement being such that the gear wheel 71 is at all times held against rotation relative to the spider 17 but is free to move in the direction of the axis of the spider 17. Gear wheel 71 includes a hub portion 71a by means of which it is rotatably mounted upon the nut member 21 at a location between the ring 38 and the handwheel 45. The upper end of hub portion 71a and the opposed downwardly facing end of handwheel boss 48 are formed with complementary clutch teeth 83 of a form similar to the teeth 68, 69 shown in Figure 5.

Actuating means are provided for effecting vertical movement of the gear wheel 71, between an upper position in which the teeth 83 are effective to couple the hand wheel 45 to the gear wheel 71, and a lower position in which the teeth 68, 69 are effective to couple the gear wheel 71 to the gear wheel 62. The dimensions of the teeth 68, 69 and 83 are such that under no circumstances can the gear wheel 71 be coupled simultaneously to the handwheel 45 and to the gear wheel 62.

The actuating means include a horizontally extending actuating shaft 100 (see Figure 3) journalled at its ends in bearings 101 and 102 respectively mounted in the bridge piece 52 and in a bracket 103 bolted to the base plate 11. Formed integrally with the shaft 100 are two spaced, parallel, radial arms 104, each of which is formed near its outer end with a screw-threaded transverse hole 105, with its axis parallel to that of the shaft 100 and in which is mounted a screwed stud 106 locked in position by a nut 107 and formed at its inner end with a cylindrical part 108 on which is mounted an arcuate shoe 109. The two shoes operatively engage the walls of a peripheral groove 110 formed in the circular hub portion 71a of the gear wheel 71. It will be seen that rotation of the shaft 100 through an appropriate arc will cause vertical movement of the gear wheel 71 between its limiting positions. The shaft 100 is formed, adjacent the end which is journalled in the bearing 102, with an outwardly extending lever arm 115 of considerable length and which terminates in a clevis 116 carrying a clevis pin 117 (see Figure 4) arranged with its axis parallel to that of the shaft 100 and operatively engaging the upper end 118 of an operating rod 119 which includes a turnbuckle 120 by means of which its length can be adjusted, locknuts 121 being provided for the turnbuckle. The lower end of the operating rod 119 is formed with a clevis 122 carrying a clevis pin 123 arranged with its axis horizontal and at right angles to that of the pin 117 and operatively engaging the upper end 124 of the piston rod 125 of power means in the form of a pneumatic actuator 126.

The pneumatic actuator 126 includes a body part 127 mounted below the base plate 11 and secured by bolts (not shown) to a downwardly extending annular boss 128 thereof, an upwardly extending spigot 129 on the body part extending partway through a bore 130 through the plate 11. The body part 127 is formed with an axial bore 140 which extends upwardly from its lower end and through the spigot 129 and which includes several parts of different diameters. Thus an upper part 140a of bore 140 is of such diameter as to provide a guide for the piston rod 125 and is of such a length as to provide a substantially fluid-tight seal between the rod and the body part. The next part 140b of the bore 140 is of much larger diameter, and the subjacent part 140c is of even larger diameter, while below the part 140c, the bore 140 narrows slightly to form the part 140d. The part 140b and the pair of parts 140c and 140d constitute respectively smaller and larger cylinders 141 and 142 of the pneumatic operator, the part 140c constituting a part of the cylinder 142 of enlarged diameter. The lowest part of the bore, part 140e, is of somewhat increased diameter to take a rubber buffer and sealing ring 143. Screwthreaded into an upper part of the body part 127 is a nipple 144 to which is connected a banjo-type coupling 145 at the end of an air supply pipe 146, and the body part 127 is bored to provide a passage 147 connecting the nipple 144 to the upper end of the cylinder 141. The body part 127 is also bored to provide a transfer passage 148 extending from a lower part of the cylinder 141 to an upper part of the cylinder 142. Disposed within the two cylinders 141 and 142 is a double piston 150 comprising an upper part or smaller piston 150a, for the most part of a diameter equal to that of the cylinder 141 but having a chamfered upper edge 151, and a hollow lower part or larger piston 150b of a diameter slightly less than that of the part 140d of the bore 140. The lower edge of the piston 150b may be rounded where it engages the buffer ring 143 like the upper edge of the piston 470b in Figure 7. It will be seen that while the larger piston 150b is near the lower limit of its travel, it is a relatively close fit within the lower end of cylinder 142, but that as it rises it enters the enlarged part of cylinder 142, in which it serves as a leaky piston. The smaller piston 150a serves to centre the larger piston 150b in the cylinder 142 so as to leave an annular air leakage path about the larger piston. Piston 150 is on a lower part of the piston rod 125 and is clamped against a central flange 152 thereon by a nut 153 screwed onto a screw-threaded lower part of the rod 125.

Screwed onto the lower end of the body part 127 is a bell-like cylinder end cover 155 formed with an internal shoulder 156 which engages the rubber buffer ring 143 and retains it in place in the bore part 140e. The cover 155 is formed with a screw-threaded axial bore 157 into which is screwed a hollow cap 158 that serves as a seating for the lower end of a compression spring 159 arranged with its upper end encircling a boss 160 on the nut 153 and acting upon the nut to bias the double piston 150 in an upward direction. The compression of the spring 159 may be adjusted by axial adjustment of the cap 158 within the cover 155 and the cap locked in position by a locknut 161. Cap 158 is formed with a vent port 162.

Also mounted on the underside of the base plate 11 is a pneumatic motor 170 of a well known type which includes an air driven rotor, the direction of rotation of which can be varied, coupled by a speed reducing gear train mounted in the motor casing to an output shaft 171 which extends upwardly through the base plate 11. Mounted on the upper end of shaft 171, above the base plate 11, is a flywheel 172 on the boss on which is formed a spur gear wheel 173 arranged to engage operatively a driven spur gear wheel 174. Gear wheel 174 is mounted on a pillar 176 arranged vertically with its screw threaded lower end 177 screwed into a hole 178 in the base plate 11 and provided above the lower screw-threaded end 177 with a flange 179 that abuts against the top of an annular boss 180 on the base plate. Also mounted on the pillar 176 and disposed respectively above and below the gear wheel 174 are two clutch plates 181 formed with inter-engaging dog teeth 183 and each formed with an annular projection 186 that extends towards the web 187 of the gear wheel 174, annular clutch rings 188 of suitable friction material being interposed between each projection 186 and the web 187. The dog teeth 183 serve to lock upper and lower clutch plates 181 together so that they rotate together even when they are both "free" relative to the gear wheel 174. The clutch plates 181 with the rings 188 and the web 187 of gear wheel 174 constitute a friction clutch. The lower of the clutch plates 181 is formed with a downwardly facing bearing surface 189 and a ball thrust bearing 190 is disposed between the surface 189 and the upper surface of the flange 179. The upper of the clutch plates 181 is secured to a hub portion 192 provided with a bush 193 that fits the pillar 176, the hub portion 192 including a spur gear wheel 194 arranged to engage operatively the spur gear wheel 62. It will be seen that the face breadth of the teeth of the gear wheel 194 is greater than that of the teeth of the gear wheel 62 so that the teeth will remain in full engagement despite limited vertical movement of the gear wheel 194 on the pillar 176. The hub portion 192, and with it the upper clutch plate 181, is biased downwardly towards the lower clutch plate 181 by a helical compression spring 197 acting between a nut 198 screw-threaded onto the upper end of the pillar 176 and the inside surface of a thimble 199 slidably mounted on the pillar with its outside bottom surface engaging the upper race 200 of a ball thrust bearing 201 arranged with its lower race 202 in engagement with the top of the hub portion 192. The actuating shaft 100 is formed with a pair of spaced, radial, parallel arms 205 which extend on either side of the thimble 199 and are arranged, when the lever arm 115 rises, to engage a nut 206 screw-threaded on to the thimble 199 and so raise the thimble and thereby remove the biasing force of the spring 197 from the upper clutch plate 181. These moving parts are normally protected by a cover 210 secured to the base plate 11.

Figures 6, 11:
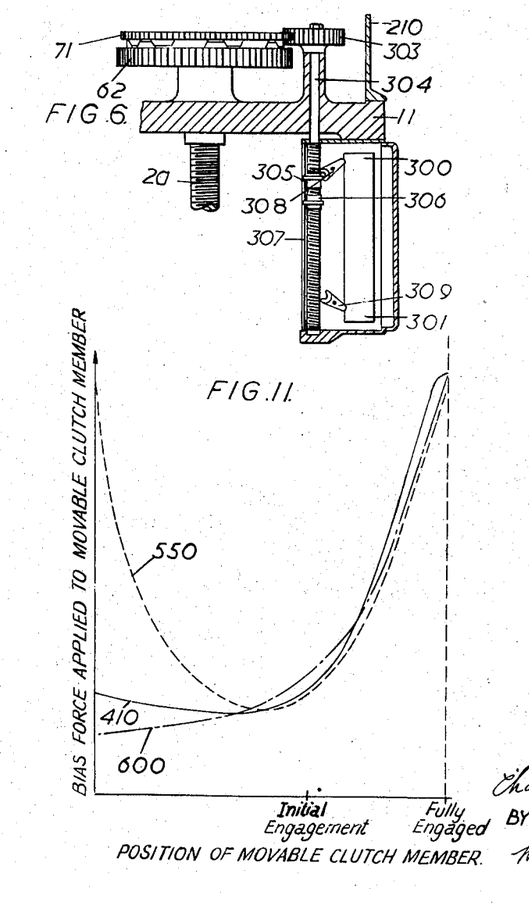
Figure 6 is a sectional side elevation of a limit switch assembly shown in Figure 1, taken on the line VI—VI of Figure 3 and as viewed in the direction indicated by the arrows.
Figure 11 is a set of curves relating the axial position of a rotatable driving clutch member shown in Figure 5 to the force, biasing the driving member towards a driven clutch member, set up by an associated actuator.

As shown most clearly in Figure 6, the spur gear wheel 71 is arranged to operate a pair of limit valves 300 and 301. A spur gear wheel 303 operatively engaging the gear wheel 71 is mounted on the upper end of a vertical shaft 304 journalled in the base plate 11. It will be seen that the teeth of gear wheel 303 are of greater depth than the teeth of gear wheel 71 so that at all times the two gear wheels are in full engagement despite limited vertical movement of gear wheel 71. The part of shaft 304 which lies below the base plate 11 is formed with a left hand screw thread for most of its length and carries two nut members 305, 306 each held against rotation by engagement of a vertical rod 307 in an appropriate recess (not detailed) in the nut member. Rotation of the gear wheel 71 will cause axial movement of the two nut members along the shaft 304 until they approach an upper or a lower limiting position, whereupon either the nut member 305 engages a lever 308 of the limit valve 300 or the nut member 306 engages a lever 309 of the limit valve 301; continued axial movement of the nuts causes the limit valve to operate and stops the rotation of the gear wheel 71, and thus the movement of the nuts, in a manner described below.

The supply of air to the pneumatic actuator 126 and to the pneumatic motor 170 is controlled by the setting of a manual control unit 310 (see Figure 12), subject to an overriding control exerted by the limit valves 300 and 301. Compressed air is supplied from a pipe 311 under control of a stop valve 312 to a large bore air pipe 313 leading to an oiler 314 from which the compressed air, laden with oil mist, passes through a pipe 315 to a power actuated motor control air stop valve 316 which includes a sliding valve member 317 which stops the flow of air when in an intermediate position, shown in Figure 12, but which when moved in either direction to a limiting position, permits the flow of air through the valve and a pipe 318 to the air inlet 319 of the motor 170 and thence through a pipe 320 to an adjustable one-way-restrictor valve 321 and thence through the pipe 146 to the air inlet nipple 144 of the pneumatic actuator 126.

Figure 13:
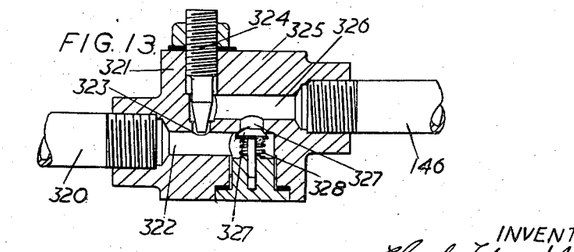
Figure 13 is a sectional side elevation of an adjustable one-way-restrictor valve indicated in Figure 12.

The valve 321, as shown in Figure 13, is formed with an inlet passage 322 communicating through an annular port 323, the effective area of which may be varied by axial adjustment of a needle valve 324 screw-threaded into the valve body 325, with an outlet passage 326. A by-pass 327 also connects passages 322 and 326 and is normally closed by a disc valve 327 biassed to closed position by a spring 328. It will be seen that the flow of air from passage 322 to passage 326 can take place only through the port 323, whereas flow in the reverse direction can also take place through by-pass 327.

The one-way-restrictor valve 321 restricts the flow of air from pipe 320 towards the pneumatic actuator 126 but permits full flow upon the return flow of air from the pneumatic actuator 126. However, such valve is unnecessary when a radial vane air motor is used as the motor 170, since, upon the closure of the air valve 316, the motor 170 will continue to run, owing to its kinetic energy, and will create a partial vacuum which will cause the pneumatic actuator to effect disengagement of the clutch teeth 68, 69 before the motor speed is greatly reduced, whilst the air line 146 leading to the pneumatic actuator may be given sufficient flow resistance to cause the desired delay in the engagement of the clutch upon starting of the motor.

Compressed air is also supplied from the pipe 313 through a pipe 330 to inlet ports 331 and 332 respectively of two slide valves 333 and 334. Valve 333 is of a type in which a sliding plunger (not detailed) is axially movable between two limiting positions in which it connects an outlet port 335 respectively to the inlet port 331 and to a vent port 336 open to the atmosphere. Movement of the plunger is effected by a rod 337 coupled to the plunger and spring biassed upwardly into contact with a single lobe cam 338 which is mounted on a rotatably mounted shaft 339 provided with a control knob 340 having three sequentially arranged operating positions, the shape and orientation of the cam 338 being such that in a first or "open" position of knob 340 the rod 337 is depressed to place port 335 in communication with the port 331 (as indicated by the dotted line in Figure 12) and that in the second and third sequential positions of knob 340 the rod 337 is in an upward position in which port 335 is placed in communication with the vent port 336 (as indicated by the continuous line in Figure 12). Valve 334 is in all respects similar to valve 333 and includes a rod 342 spring biassed upwardly into contact with a single lobe cam 343 mounted on the shaft 339, but so oriented relative to the control knob 340 that when the knob is in its first and second sequential positions the rod 342 is in its upward position in which an outlet port 344 of valve 334 is placed in communication with a vent port 345 of the valve (as indicated by the continuous line in Figure 12), while when the control knob is in its third or "shut" sequential position the rod 342 is in its depressed position in which the outlet port 344 is placed in communication with the inlet port 332 (as indicated by the dotted line in Figure 12).

The outlet ports 335 and 344 are respectively connected by pipes 350 and 351 to inlet ports 352 and 353 of the two limit valves 300 and 301. These limit valves are similar in their internal construction to the valves 333 and 334.

The plunger of valve 300 is operatively connected to a rod 355 spring biassed into contact with a lever 356 mounted near one end on a pivot 357 and pivotally connected near the opposite end at 358 to a short rod 359 guided to bear against nose 360 of the lever 308. Lever 308 is mounted on a pivot 362 and is formed, on the side of the pivot 362 which is remote from the nose 360, with a recess 363 the sides of which are respectively operatively engaged by the nut member 305 as it becomes level with the lever while travelling in opposite directions. While the nut member 305 is on a central portion of the screw-threaded port of shaft 304, the levers 308 and 356 lie in the positions shown in Figure 12 and an outlet port 370 of valve 300 is placed in communication with the inlet port 352 (as indicated by the continuous line in Figure 12), but as the nut member is caused to move level to and engage the lever 308 the rod 355 is caused to move inwardly of the valve 300 so that the outlet port 370 is placed in communication with a vent port 371 (as indicated by the dotted line in Figure 12) which is in communication with the atmosphere.

The plunger of limit valve 301 is similarly coupled by a rod 375, a lever 376 and a further rod 379 to the lever 309, which is arranged and adapted to be engaged by the nut member 306 as it approaches the limit of its downward travel.

Figure 12:
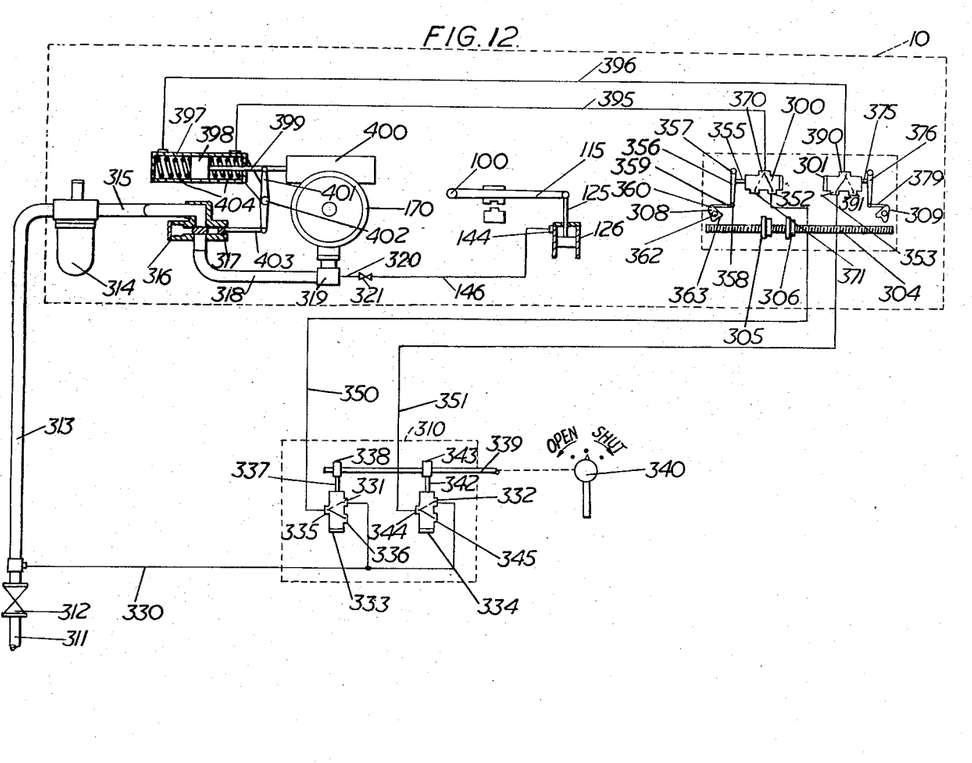
Figure 12 is a schematic representation of a pneumatic control system associated with the valve gear shown in Figure 1.

Limit valve 301 is provided with an outlet port 390 and a vent port 391 and, when the nut member 306 is on a central portion of the screw-threaded part of shaft 304, the outlet port 390 is placed in communication with the inlet port 353 (as indicated by the continuous line in Figure 12), but as the nut member is caused to move level to and engage the lever 309 the rod 375 is caused to move inwardly of the valve 301 so that the outlet port 390 is placed in communication with the vent port 391 (as indicated by the dotted line in Figure 12).

The limit valve outlet ports 370 and 390 are connected respectively by pipes 395 and 396 to the opposite ends of a double-ended power cylinder 397 in which is located a piston 398 coupled by a piston rod 399 to a reversing gear 400 for the pneumatic motor 170. The piston rod 399 is connected by a lever 401 mounted on a central pivot 402 to a rod 403 coupled to the sliding valve member 317 of the stop valve 316, the arrangement being such that when the reversing gear is properly positioned for either forward or reverse operation of the pneumatic motor 170, the valve member 317 will be properly positioned for the admission of compressed air to the pipe 318. The piston rod 399 is biassed by springs 404 to the intermediate position shown in Figure 12, in which stop valve 316 is closed.

The operation of the embodiment of the invention described above with reference to Figures 1 to 6, 12 and 13 is as follows:

The function of the valve operating unit 10 is to effect vertical positioning of the operating spindle 2 of the main valve 1 to a desired fully open, fully closed, or partly open position. If it is desired to close the main valve 1 fully, then with the compressed air stop valve 312 open the control knob 340 (see Figure 12) is turned to its third or "shut" operating position, thereby placing outlet port 344 of valve 334 in communication with the inlet port 332 but leaving the outlet port 335 of valve 333 in communication with the vent port 336. As a result, compressed air will flow along the pipe 351 to the inlet port 353 of limit valve 301, and unless the main valve 1 is already closed, in which case the nut member 306 will have operated the limit valve 301 to block communication between ports 353 and 390, compressed air will flow through pipe 396 to one end of the power cylinder 397 and force the piston 398 towards the other end of the cylinder, air displaced from this second end of the cylinder flowing along the pipe 395 to the outlet port 370 of the limit valve 300. If the nut member 306 is in such a position on the shaft 304 that it has operated the lever 308 to place the outlet port 370 in communication with the vent port 371, this displaced air will escape to atmosphere through the vent port 371. Otherwise, the displaced air will flow through valve 300 to the inlet port 352 and thence through the pipe 350 to the outlet port 335 of the valve 333 and through the valve to the vent port 336 and thence escape to atmosphere.

The movement of the piston 398 moves the piston rod 399 so to set the reversing gear 400 as to cause the rotor of the pneumatic motor 170 to rotate in a first direction, hereinafter referred to as the forward direction, such that the flywheel 172 rotates in an anti-clockwise direction, as viewed from above. The movement of piston rod 399 also causes movement of the lever 401 and the rod 403 to effect opening of the stop valve 316, thus admitting air under pressure to the air inlet 319 of the motor 170, the rotor of which starts to rotate in the forward direction and gradually gains speed.

Opening of the stop valve 316 also permits the flow of air through pipe 320 to the valve 321, which restricts the flow of air through the pipe 146 to the pneumatic actuator 126, so that the air pressure applied to the actuator 126 does not reach an effective working value until after a short delay during which the rotor of motor 170 achieves its full working speed.

Figure 1:
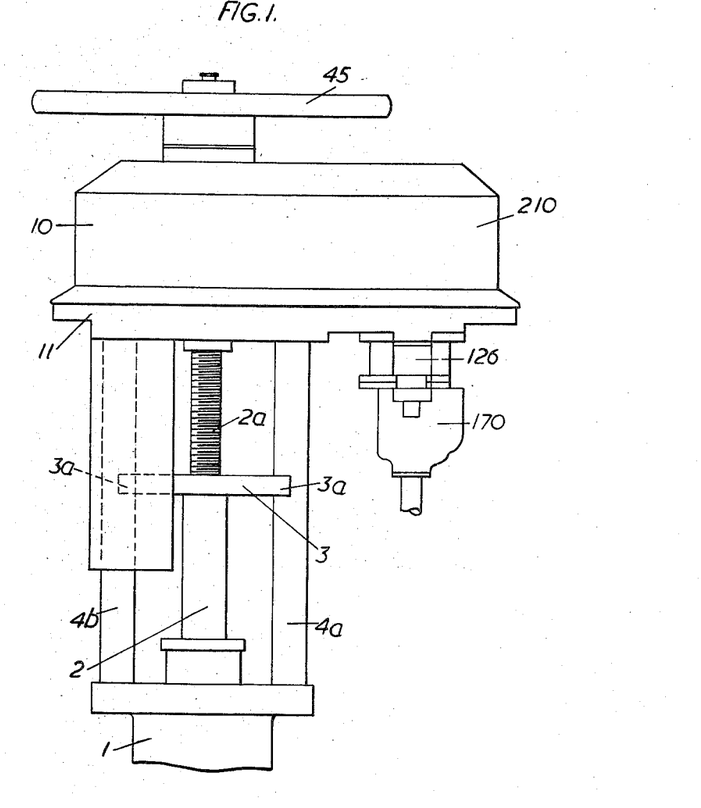
Figure 1 is a front view of the upper part of a parallel slide valve and of valve actuating gear associated with the valve.
Figure 2A:
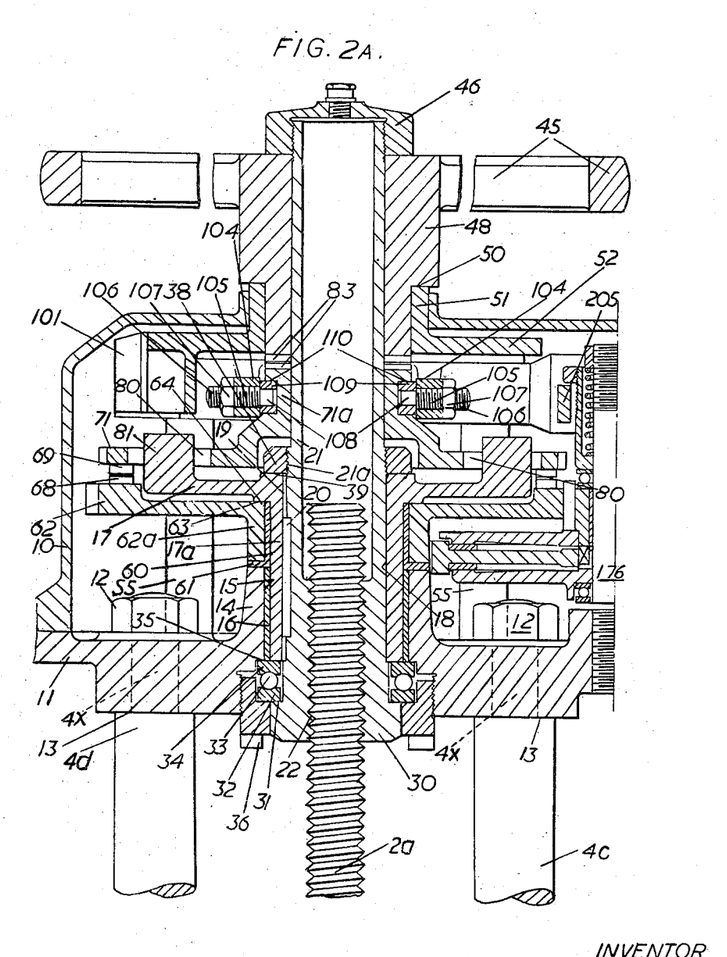
Figures 2A and 2B are respectively the left hand and the right hand sides of a sectional front elevation of valve actuating gear shown in Figure 1, taken on the line II—II of Figure 3.
Figure 2B:
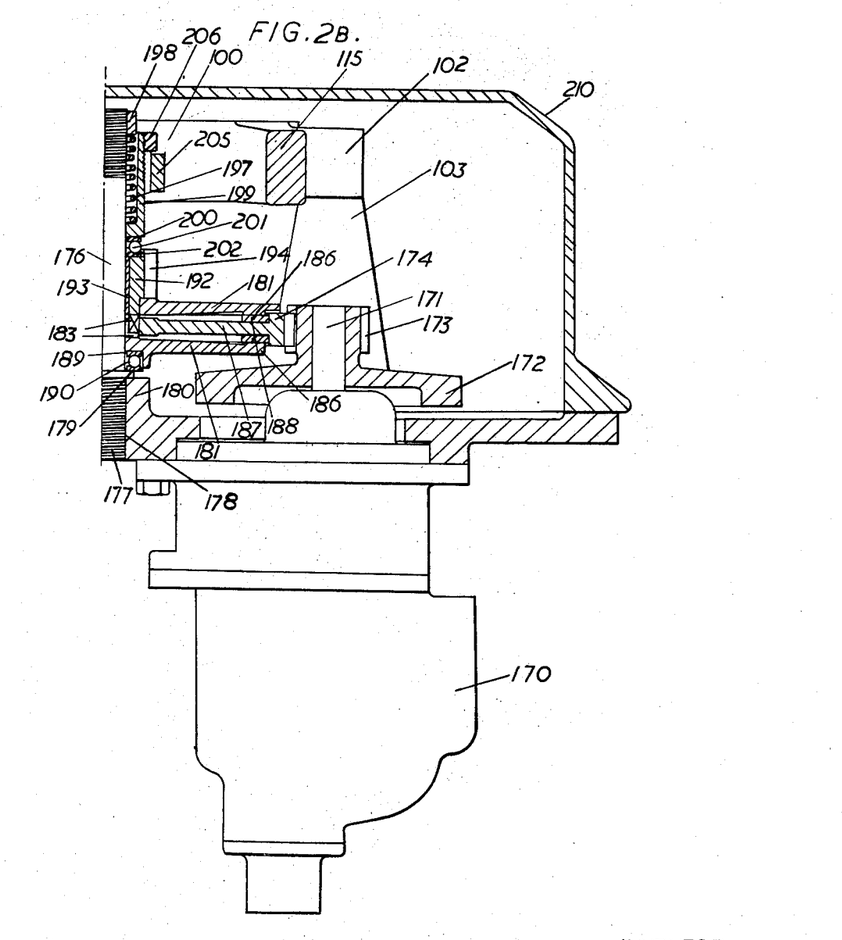
Figure 3:
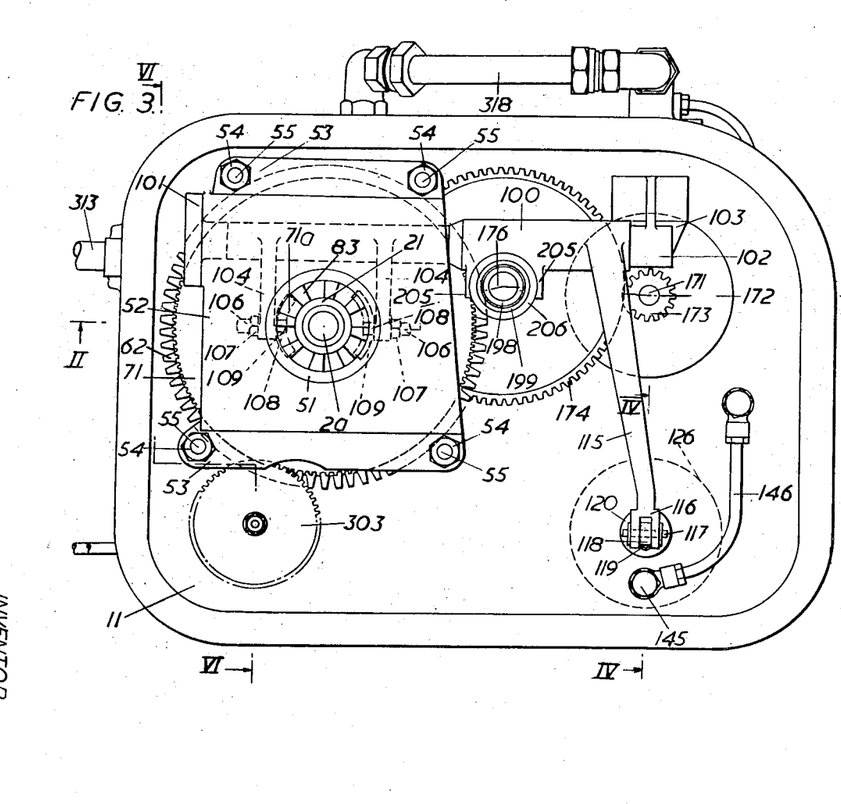
Figure 3 is a plan view of the apparatus shown in Figure 1, with a valve operating handwheel and protective cover removed.
Figure 4:
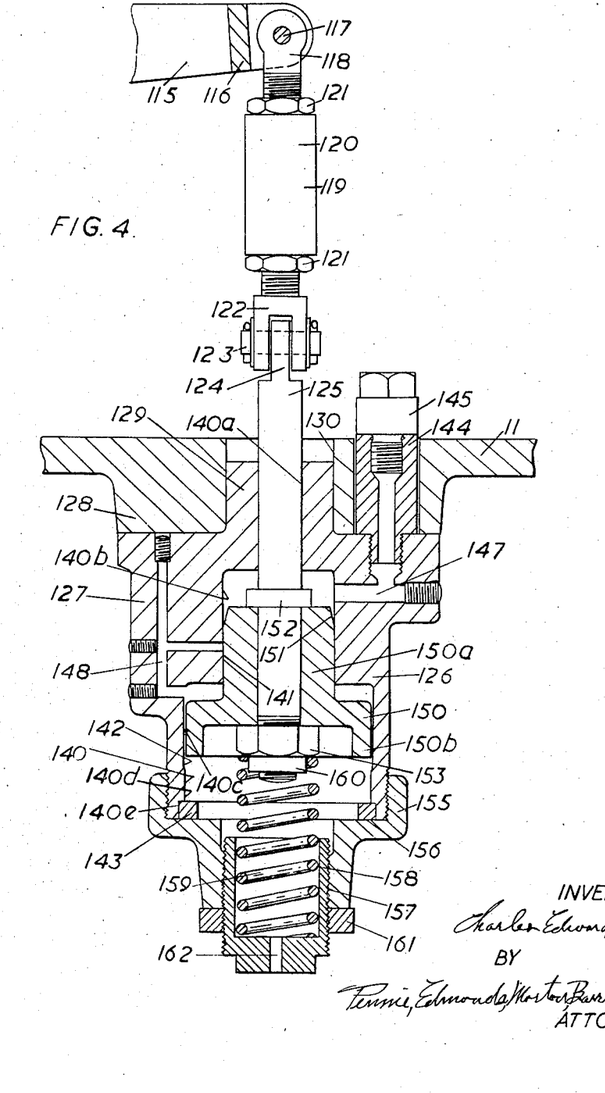
Figure 4 is a sectional side elevation of a pneumatic actuator, taken on the line IV—IV of Figure 3 and as viewed in the direction indicated by the arrows.

Referring now to Figure 4, upon the admission of compressed air to the pipe 146 and thus to the nipple 144 of the pneumatic actuator 126, air flows through the passage 147 into the upper end of the cylinder 141, where it sets up a force upon the double piston 150 determined by the magnitude of the air pressure and the dimensions of the piston 150a and the piston rod 125. As the piston rod 125 is allowed to descend, the effective downward force produced upon the piston rod falls off, since for the first part of its travel the force produced by the air pressure on the piston 150a remains constant whereas the upward reaction of the compression spring 159 increases. At approximately half its downward travel, the piston 150a commences to uncover the entrance to the transfer passage 148, the combination of the chamfered part 151 and the coacting end of passage 148 serving as a throttle valve and the effect of the chamfered part 151 being to decrease the throttling action progressively as the piston descends. Once the entrance to the transfer passage 148 is partially uncovered, air flows from the cylinder 141 through the transfer passage 148 into the upper end of the cylinder 142 and tends to escape past the leaky piston 150b to the space below the double piston and thence through the vent 162 to the atmosphere. The pressure which builds up in the upper part of the cylinder 142 therefore depends upon the degree of restriction of the entrance to the passage 148 by the chamfered part 151, by the size of the passage 148, and by the amount of leakage past the piston 150b, this leakage falling off as the lower end of piston 150b enters within the bore part 140d. As a result, the net downward force on the piston rod 125 increases as the rod descends below the mid-point of its travel. Near the lower limit of its travel the lower end of piston 150b comes into engagement with the buffer ring 143, which then exerts an upward reaction upon the piston and so reduces the rate of increase of the net downward force on the piston rod over a terminal part of its travel.

These variations in the net downward force produced upon the piston rod during its downward travel are illustrated graphically in Figure 11 by the curve 410.

It will be seen, therefore, that upon the opening of the air stop valve 316, the piston rod 125 of the pneumatic actuator 126 is drawn downwardly, and this movement is transmitted through the operating rod 119 to the lever arm 115, so exerting a torque upon the actuating shaft 100 which rotates the shaft to permit lowering of the thimble 199 (see Figure 2B) under action of the spring 197 so as to render the friction clutch effective and to move the gear wheel 71 positively downwardly until the teeth 69 mesh with the teeth 68 so that the gear wheel 62 is positively coupled through these teeth to the gear wheel 71 and hence through the flat lugs 81 to the spider 17 and the nut member 21.

It has already been explained that the function of the valve 321 (see Figure 12) is to delay the application of the full air pressure to the pneumatic actuator 126, and that as a result the pneumatic motor 170 is given an opportunity to run up to operative speed. Thus the flywheel 172 (see Figure 2B) attains a suitable working speed before the thimble 199 is released to permit the compression spring 197 to exert a downward force upon the upper clutch plate 181 so clamping the web 187 of the gear wheel 174 between the pair of clutch plates 181 and causing rotation transmitted from the motor 170 through the gear wheels 173 and 174 to be transmitted through the upper clutch plate 181 to the gear wheel 194 and thence to the gear wheel 62.

Thus, upon operation of the pneumatic actuator 126 the motor 170 is caused to rotate the gear wheel 62 and, through the teeth 68, 69, the gear wheel 71, the lugs 81, the spider 17 and the key 20, to rotate the nut member 21. The forward direction of rotation of the rotor of motor 170 is in an anti-clockwise direction as viewed from above, hence the nut member 21 rotates also in an anti-clockwise direction and, since the upper end part 2a of the main valve operating spindle 2 is formed with a right hand screw-thread, the operating spgindle 2 is caused to move downwardly to effect closing of the main valve.

The gear wheel 71 rotates, with the nut member 21, in an anti-clockwise direction and causes the gear wheel 303 and the shaft 304 on which it is mounted to rotate in a clockwise direction. Since the lower part of the shaft 304 is formed with a left hand screw-thread, this rotation of shaft 304 will cause the two nut members 305 and 306 to move downwardly along the shaft until nut member 306 engages the lever 309 and thereby effects movement of the plunger of limit valve 301 to interrupt the flow of compressed air through the valve from inlet port 353 to outlet port 390 and to place the outlet port 390 in communication with the vent port 391. This connection of the pipe 396 to the vent port 391 allows the biasing springs 404 associated with the piston rod 399 of the power cylinder 397 to return the piston 398 to the central position shown in Figure 12, upon which the motor reversing gear 400 assumes a neutral position and the stop valve 316 is closed. The pitch of the screw-thread on the shaft 304 is so selected and the nut member 306 is so positioned upon the shaft 304 that nut member 306 operates the lever 309 as the main valve 1 reaches its fully closed position.

Closure of the stop valve 316 cuts off the supply of compressed air to the motor 170 and to the pneumatic actuator 126, air in the actuator flowing back through pipe 146 to the motor 170 so that the pressure in the actuator is rapidly reduced. As a result, the piston rod 125 of the actuator is forced upwards by the spring 159 and this movement, through the lever arm 115, rocks the actuating shaft 100 to raise the thimble 199, whereupon the motor flywheel 172 is free to continue rotating without driving the gear wheel 194. Furthermore, the rotation of actuating shaft 100 raises the gear wheel 71 so that the teeth 69 disengage from the teeth 68 and the sets of teeth 83 interengage to couple the gear wheel 71 with the handwheel 45.

If it is desired to open the main valve 1 fully, the control knob 340 is turned to its first or "open" operating position, thereby placing outlet port 344 of valve 334 in communication with the vent port 345 and depressing the rod 337 to move the plunger of valve 333 to place the outlet port 335 of that valve in communication with the inlet portion 331. As a result, compressed air will flow along the pipe 350 to the inlet port 352 of limit valve 300, and unless the main valve 1 is already open, in which case the nut member 305 will have operated the limit valve 300 to block communication between ports 352 and 370, compressed air will flow through pipe 395 to the second end of the power cylinder 397 and force the piston 398 towards the first end of the cylinder, air displaced from this first end of the cylinder flowing along the pipe 396 to the outlet port 390 of the limit switch 301. If the nut member 306 is in such a position on the shaft 304 that it has operated the lever 309 to place the outlet port 390 in communication with the vent port 391, this displaced air will escape to atmosphere through the vent port 391. Otherwise, the displaced air will flow through the valve 301 to the inlet port 353 and thence through the pipe 351 to the outlet port 344 of the valve 334 and through the valve to the vent port 345 and thence to atmosphere.

The movement of the piston 398 moves the piston rod 399 so to set the reversing gear 400 as to cause the rotor of the pneumatic motor 170 to rotate in reverse direction, that is to say in such a direction that the flywheel 172 rotates in a clockwise direction as viewed from above. The movement of the piston 398 also causes the stop valve 316 to open and thus permit the flow of compressed air to the pneumatic motor 170, which commences to rotate in the reverse direction, and to the pneumatic actuator 126 under the control of the valve 321, the sequence of events being similar to the sequence of events described above in connection with the closure of the main valve 1, but the nut member 21 now rotating in a clockwise direction, as seen from above, so that the valve spindle 2 is drawn upwardly to open the main valve 1, and the shaft 304 rotating in an anti-clockwise direction, so that the nut members 305, 306 rise on the shaft 304 as the operating spindle 2 of the main valve 1 rises, the nut member 305 being so positioned on the shaft 304 that as the spindle 2 reaches a position at which the main valve 1 is fully open, the nut member 305 engages the lever 308 to effect closure of the compressed air valve 316, thereby effecting declutching of the flywheel 172 from the gear wheel 194 and raising the gear wheel 71 to disconnect that gear wheel from gear wheel 62 and to couple it to the handwheel 45, in a manner similar to that described above for the operation of the limit valve 301.

If it is desired to set the main valve operating spindle 2 at some position between its fully open and fully closed positions, this may be done by moving the control knob 340 to either the open position or the shut position as appropriate, and observing the movement of the spindle 2 until it assumes the desired position, upon which the control knob is returned to its second or "off" operative position, whereupon the supply of compressed air which was taking place through either pipe 350 or pipe 351 is discontinued, and that pipe vented to atmosphere through the associated vent port 336 or 345, thereby effecting closure of the air stop valve 316 and stoppage of the movement of the spindle 2.

Manual adjustment of the operating spindle 2 of the main valve 1 is possible when either the air stop valve 312 is closed or the control knob 340 is set to its "off" position. Under both of these conditions the handwheel 45 is coupled through teeth 83, gear wheel 71, lugs 81 and spider 17 to nut member 21 and so is effective to cause rotation of the nut member and consequent axial adjustment of the operating spindle 2.

Whenever the air motor 170 is effective to drive the nut member 21 a torque is transmitted from the gear wheel 62 to the gear wheel 71 through engagement of the teeth 68 with the teeth 69. The drive is transmitted through the inclined tooth edges 73 so that an axial reaction is produced upon the two gear wheels tending to separate them. This reaction is normally resisted by a downward force applied to the gear wheel 71 from the actuating shaft 100 through the arms 104. If for any reason movement of the main valve operating spindle 2 is restrained, the teeth 69 tend to ride up the inclined edges 73 of the teeth 68 so forcing the gear wheels 62 and 71 apart.

The force tending to separate the gear wheels 62 and 71 is transmitted through the arms 104, the shaft 100, the lever arm 115 and the operating rod 119 to the piston rod 125 and opposes the effort of the pistons 150a, 150b. When this force becomes so great that the pistons are moved away from their final positions, as soon as the larger piston 150b parts from the buffer ring 143 leakage of the pressure fluid past that piston occurs and the pressure acting on the larger piston commences to fall. Upward movement of the pistons in the clutch disengaging direction is therefore accompanied by a rapid decrease in effort and the clutch disengages in a rapid and definite manner. The part of the larger cylinder of enlarged diameter permits release of the pressure fluid acting on the larger piston during the return stroke. The arrangement is such that the pneumatic actuator exerts a reduced force biassing the clutch teeth 68, 69 together even when the teeth 69 are sliding over the crown portions 75 of teeth 68.

The pneumatic actuator 126 has a position/output force characteristic, indicated by the curve 410 in Figure 11, which is most advantageous in this particular application of the pneumatic actuator, since it provides a comparatively large force to bias the gear wheel 71 towards the gear wheel 62 when the teeth 68, 69 are in full engagement, yet should the main valve operating spindle encounter any serious resistance to its free movement, causing the teeth 69 to rise up on the teeth 68, the piston rod 125 is forcibly repositioned and as a result the force provided by the actuator falls off appreciably. In the actual actuator illustrated, the force provided by the actuator falls off progressively, as the teeth 68, 69 slide from their fully engaged to their initial engagement positions, to a value some 17 percent of the value when fully engaged. Thus the actuator 126 with the clutch teeth 68, 69 provides a torque limiting clutch arrangement.

When the teeth 68, 69 have passed one another, the pneumatic actuator acts to force clutch gear wheel 71 downwardly into the "fully engaged" position, but due to the circumferential spacing of the teeth 68 and of the teeth 69, the gear wheel 62 is able to rotate freely, without driving the gear wheel 71, through a large angle before teeth 68, 69 are again in engagement. This free rotation allows the pneumatic motor 170 to recover its full working speed and, upon the teeth 68, 69 meeting, the valve spindle 2 is subjected to a torsional impulse derived partly from the kinetic energy of the rotating parts. This torsional impulse is momentarily in excess of the value of torque required, in effecting clutch disengagement, to overcome the inertia of the parts requiring acceleration during clutch disengagement action. Should the resistance to the movement of the main valve operating spindle 2 not be overcome by the effect of the first disengagement and re-engagement of the clutch, the clutch operates repeatedly in a similar manner to administer a series of torsional impulses until the resistance is cleared, whereupon the clutch teeth remain fully in engagement. A serious defect may prevent these torsional impulses from overcoming the resistance to movement of the main valve spindle 2, and in such a case the action of the clutch under overload gives an audible warning of the defect.

Although the pneumatic actuator 126 described above has been described in connection with a torque limiting clutch embodied in a pneumatic valve operating unit, it will be understood that it is applicable not only to other forms of valve operating units but also to torque limiting clutches used for quite different applications.

Figure 7:
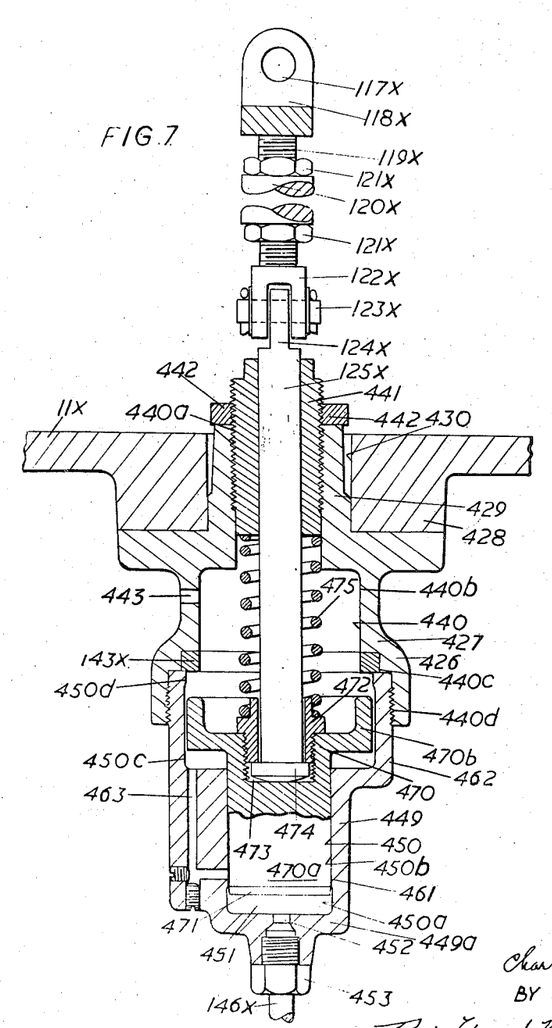
Figure 7 is a sectional side elevation of an alternative form of pneumatic actuator.

Furthermore the actual form of the pneumatic actuator may be varied. Thus Figure 7 illustrates an alternative form of pneumatic actuator 426 adapted to operate in a manner basically the same as that of the actuator 126 and intended for use in a pneumatic valve operating unit similar in its essentials to the unit 10 and incorporating an actuating shaft corresponding to the shaft 100 but so arranged that radial arms corresponding to the radial arms 104 are on the opposite side of the shaft to a lever arm corresponding to the lever arm 115. In such an arrangement, it is necessary that the lever arm be forced upwards upon the application of air pressure to the pneumatic actuator 426. As with the actuator 126 shown in Figure 4, this lever arm carries a clevis pin 117x arranged with its axis parallel to that of the actuating shaft and operatively engaging a clevis 118x formed at the upper end of an operating rod 119x which includes a turnbuckle 120x by means of which its length can be adjusted, locknuts 121x being provided for the turnbuckle. The lower end of the operating rod 119x is formed with a clevis 122x carrying a clevis pin 123x arranged with its axis horizontal and at right angles to that of the pin 117x and operatively engaging the upper end 124x of the piston rod 125x of power means in the form of the pneumatic actuator 426.

The pneumatic actuator 426 includes a body part 427 mounted below a base plate 11x, corresponding to the base plate 11, and secured by bolts (not shown) to a downwardly extending annular boss 428 thereof, an upwardly extending spigot 429 on the body part extending through a bore 430 in the plate 11x. The body part 427 is formed with an axial bore 440 which extends from its lower end upwardly through the spigot 429 and which includes several parts of different diameters. Thus an upper part 440a of bore 440 is screw-threaded over an upper part of its length and serves as a housing for a guide 441 for the piston rod 125x screwed in the bore part 440a and provided with a lock nut 442. The guide 441 is of such a length that it provides a substantially fluid-tight seal between the rod and the guide. The next part 440b of the bore 440 is of much larger diameter and the body part is formed with a vent port 443 which terminates in this part of the bore. The subjacent part 440c is of still larger diameter and serves as a housing for a rubber sealing and buffer ring 143x, whilst the lowest part 440d is of even larger diameter and is screw-threaded. A lower body part 449 is screw-threaded at its upper end to engage the bore part 440d and is formed with an axial bore 450 which extends from its upper end to adjacent its closed lower end 449a and which includes several parts of different diameters. The lowest bore part 450a is of somewhat larger diameter than the superjacent part 450b and provides a chamber 451 having an inlet port 452 into an outer end of which is screwed a nipple 453 at the end of an air supply pipe 146x, which corresponds to the air supply pipe 146 in the embodiment described above with reference to Figures 1 to 6. The bore part 450c, which is immediately above the bore part 450b, is of much larger diameter than bore part 450b and the uppermost bore part 450d is of somewhat lesser diameter than the part 450c. The pair of parts 450a, 450b and the pair of parts 450c, 450d constitute respectively smaller and larger cylinders 461 and 462 of the pneumatic operator, the part 450c constituting a part of the cylinder 462 of enlarged diameter. The body part 449 is bored to provide a transfer passage 463 extending from an intermediate part of cylinder 461 to the lower end of cylinder 462.

Disposed within the two cylinders 461 and 462 is a double piston 470 comprising a lower part or smaller piston 470a for the most part of a diameter equal to that of the bore part 450b but having a chamfered lower edge 471, and an upper part or larger piston 470b of a diameter somewhat less than that of the part 450d of the bore 450. It will be seen that while the larger piston 470b is near the upper limit of its travel, it is a leaky-fit within the upper end of cylinder 462, and that as it sinks it enters the enlarged part of the cylinder 462.

The double piston 470 is coupled to the lower end of the piston rod 125x by a flanged sleeve 472 screwed into a recess 473 in the upper face of the piston rod and bearing upon an enlarged end 474 of the piston rod. A helical compression spring 475 bearing at its ends respectively against the flange of sleeve 472 and against the guide 441 serves to bias the double piston 470 downwardly of the actuator 426.

Upon the application of compressed air through the pipe 146x to the lower end of cylinder 461, it sets up a force upon the double piston 470 determined by the magnitude of the air pressure and the diameter of the smaller piston 470a. As the piston rod 125x is allowed to rise, the effective upward force produced upon the piston rod falls off, since for the first part of its travel the force produced by the air pressure on the piston 470a remains constant whereas the downward reaction of the compression spring 475 increases. At approximately the mid-position of its upward travel, the smaller piston 470a commences to uncover the entrance to the transfer passage 463, the effect of the chamfered part 471 being to decrease the throttling action progressively as the piston rises. Once the entrance to the transfer passage 463 is partially uncovered, air flows from the cylinder 461 through the transfer passage 463 into the lower end of the cylinder 462, and tends to escape past the leaky piston 470b to the space above the double piston 470 and thence through the vent port 443 to the atmosphere. The pressure which builds up in the lower part of the cylinder 462 therefore depends upon the degree of restriction of the entrance to the passage 463 by the chamfered part 471, by the size of the passage 463, and by the amount of leakage past the piston 470b; this leakage falling off as the upper end of piston 470b enters within the bore part 450d, in which it is a relatively close fit. As a result, the net upward force on the piston rod 125x increases as the rod rises above the mid-point of its travel, until the upper end of piston 470b actually engages the buffer ring 143x, which then exerts a downward reaction upon the piston and so decreases the rate of increase in the net upward force on the piston rod over a terminal part of its travel. It will be seen that the combination of the chamfered part 471 with the coacting end of the passage 463 serves as a throttle valve.

These variations in the net upward force produced upon the piston rod during its upward travel are similar to those produced in the pneumatic actuator 126 and illustrated graphically in Figure 11 by curve 410.

Figure 8:
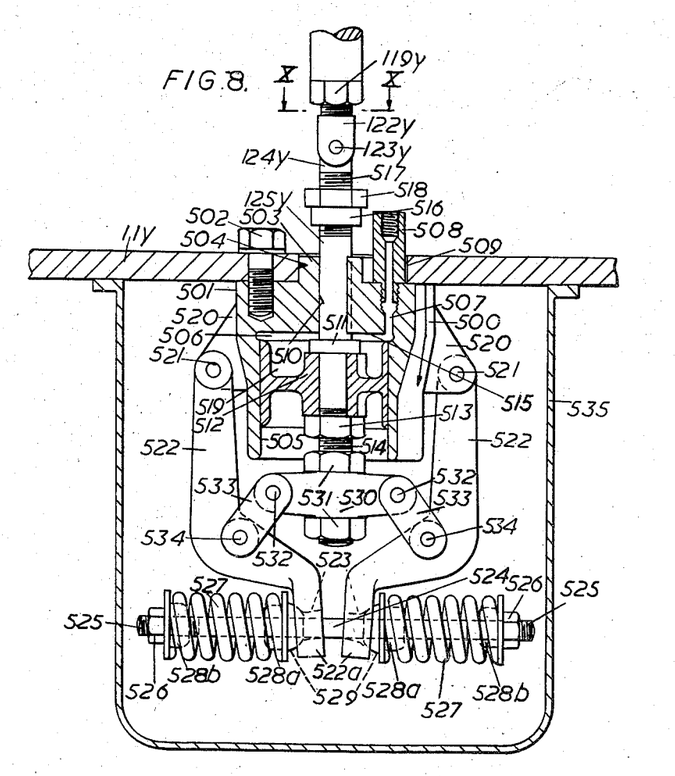
Figure 8 is a sectional front view of a third form of pneumatic actuator, taken on the line VIII—VIII of Figure 10.
Figure 9:
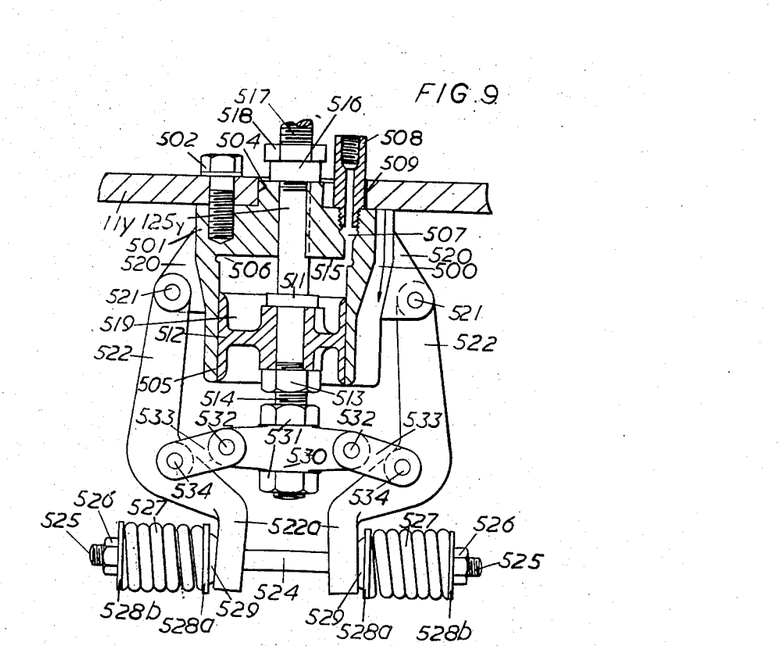
Figure 9 is a sectional front view of the third form of pneumatic actuator, similar to Figure 8, but with the moving parts in a different operative position.
Figure 10:
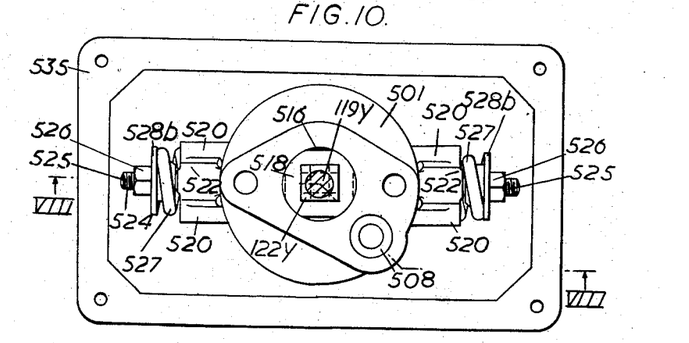
Figure 10 is a sectional plan view of the pneumatic actuator shown in Figure 8, taken on the line X—X of Figure 8.

Figures 8, 9 and 10 illustrate another form of pneumatic actuator which has an "output force/piston rod position" characteristic that rises steeply over the range between the positions of "initial engagement" and "fully engaged," in like manner to the curve 410 of Figure 11.

The pneumatic actuator 500 is of the forward acting type shown in Figure 4, in which upon the application of compressed air to the actuator, an operating rod 119y, corresponding to the operating rod 119 in Figure 4, is forced downwardly. The lower end of the operating rod 119y is formed with a yoke 122y carrying a clevis pin 123y arranged with its axis horizontal and operatively engaging the upper end 124y of a piston rod 125y of the pneumatic actuator 500. The actuator 500 includes a body part 501 mounted below the base plate 11y, which corresponds to the base plate 11 in Figures 1 to 5, and secured by stud bolts such as bolt 502 thereto, an upwardly extending spigot 503 on the body part extending partway through a bore 504 formed in the plate 11y. The body part is formed with an axial bore 505 for the most part of a single diameter but formed with an enlargement at its upper end forming a chamber 506 from which an air inlet port 507 extends upwardly, the port being screw-threaded at its upper end to receive an air inlet nipple 508 that protrudes through a hole 509 in the base plate 11y. An upward extension 510 of bore 505, of much smaller diameter than the bore proper, extends upwardly through the spigot 503 and serves as a guide for the piston rod 125y and is of such a length as to provide a substantially fluid-tight seal between the piston rod and the body part. This piston rod is formed with a medial flange 511 against the lower face of which is clamped a piston 512 by a nut 513 engaging a screw-threaded lower part 514 of the piston rod. Upward movement of the piston rod through the body part 501 is limited by engagement of the flange 511 with the end 515 of a chamber 506 or alternatively by the adjustment of the operating rod 119y, and downward movement of the piston rod is limited by a nut 516, mounted on a screw-threaded part 517 of the rod 125y above the base plate 11y, locked in a desired position thereon by a locknut 518, and arranged to engage the upper surface of the spigot 503 to check downward movement of the piston rod. The upper end of the bore 505 constitutes a cylinder 519 in which the piston 512 is a close working fit.

Two pairs of lugs 520 are formed on the outside of the body part 501 respectively in diametrically opposite positions, each pair of lugs carrying a horizontally extending pivot pin 521 which serves as a pivotal mounting for a reversely bent lever arm 522, the lower ends 522a of the two lever arms 522 extending downwardly side by side vertically below the piston 512. These lower ends 522a are bored at 523 to admit with considerable side-play a rod 524 which is formed at each end with a screw-threaded part 525 on which is screwed a nut 526. Assembled on the rod 524 between each nut 526 and the adjacent lever arm end 522a is a compression spring 527 bearing at its two ends against thimbles 528a, 528b fitted over the rod 524 and bearing respectively against the lever arm end 522a and the nut 526. Each thimble 528a and the associated lever arm are so formed that at their place of engagement they form a ball and socket joint 529. The two springs 527 thus bias the lever arms 522 towards one another with a force that increases with an increase in the distance between the two arms.

Mounted on the screw-threaded part 514 of the piston rod 125y is a cross-head 530 adjustably clamped in position by two nuts 531 disposed respectively above and below the cross-piece, each end of the cross-piece carrying a pivot pin 532 on which are mounted a pair of toggle links 533 coupled at their outer ends to the adjacent lever arm 522 by a cross pin 534.

The pneumatic actuator 500 is enclosed by a protective casing 535 secured by stud bolts (not shown) to the underside of the base plate 11y.

Upon the application of compressed air through the nipple 508 to the cylinder 519 a downward force will be produced upon the piston 512 the magnitude of which will depend upon the diameter of the piston, the diameter of the piston rod 125y and the pressure of the air. If the piston is allowed to descend while the air pressure is maintained constant, the effective downward force produced upon the piston rod varies in a manner indicated by the curve 550 in Figure 11. As the piston rod descends, the torque produced on the arms 522 by the springs 527 progressively increases as the arms swing about their pivots 521, but at the same time the change in the inclination of the toggle links 533 to the axis of the piston rod 125y causes a gradual falling off in the ratio "angular movement of arms 522/axial movement of piston rod 125y" and also a gradual falling off of the ratio "axial force produced on piston rod 125y/torque on arms 522," the net effect of these variations being the characteristic curve 550.

It may be shown that in the arrangement illustrated the force "E" exerted by each compression spring and acting axially of the piston rod 125y to oppose the force exerted on the piston by the compressed air in the cylinder 519 is given by:

$$E = [(k_1 + ds) \sin A]/k_3 \cos w$$

where $k_1$ is a constant depending upon the initial degree of compression of spring 527, i. e. when in the position shown in Figure 8;

$d$ is a measure of the further reduction in length of spring 527;

$s$ is a constant depending upon the stiffness of spring 527;

$A$ is the angle between the axis of the toggle link 533 and a normal to the axis of the piston rod 125y;

$k_3$ is a constant depending upon the physical dimentions of the lever arm 522;

$w$ is the angle between the axis of the toggle link and a normal to the line joining pins 521 and 534.

As a result, the upward force produced upon the piston rod 125y by the springs 527 at first increases to a maximum value at approximately its mid-travel position, and then falls off to a value which, if the toggle arm were allowed to become horizontal, would be zero. The effective downward force produced by the actuator upon the piston rod 125y therefore passes through a minimum value at about its mid-travel position.

Figure 9 illustrates the downmost position that the piston rod 125y attains, and it will be noticed that the toggle links 533 never pass a horizontal position, beyond which they would exert a downward force upon the piston rod 125y.

As in the construction of pneumatic actuators 126 and 146 illustrated respectively in Figures 4 and 7, over a part of its travel from an "initial engagement" position to a "fully engaged" position, the force on the piston rod 125y progressively increases.

Merely for purposes of comparison, Figure 11 includes a curve 600 indicating the characteristic curve obtained in an electrically operated solenoid actuator of the type in common use where the valve operating unit is driven by an electric motor.

In the form of actuator described above with reference to Figures 8, 9 and 10, admission of pressure fluid to the cylinder draws the piston rod into the cylinder but if desired an actuator embodying a similar mechanism may be arranged to project the piston rod upon admission of pressure fluid to the cylinder. Thus the actuator cylinder may be provided at its open end with a cylinder cover through which the piston rod extends, the cylinder wall being provided with a duct for admitting pressure fluid to the space between the piston and the cylinder cover, the toggle links at the same time being inclined in the appropriate direction.

Each of the arrangements of torque limiting clutch described above has the characteristic that driving and driven members are urged together with a force which lessens as the members are forced apart by the reaction set up between teeth, provided respectively on the two members and serving to transmit rotary motion from one of the members to the other. It follows that, in each arrangement, if the torque transmitted by the clutch reaches some predetermined high value, the members are forced apart and the clutch becomes ineffective to transmit a steady torque until the torque which is resisting movement of the driven member falls to some predetermined low value. At the same time, the clutch remains effective to produce a series of torque impulses which tend to overcome the resistance to movement of the driven member.

What is claimed is:

1. A torque limiting clutch comprising a driving member, a driven member, fluid actuated power means, an output rod movable by the power means and coupled to one of the members, the power means being adapted, when energized from a source of fluid under pressure, by movement of the output rod to urge the two members together, and clutch teeth provided on the driving and driven members, arranged to intermesh upon the members being brought together, and having co-acting surfaces so inclined to the direction of transmission of force that as the driving member drives the driven member the reaction between the teeth tends to force the two members apart, the power means being adapted to provide a force which through the output rod urges the two members together and which lessens as the reaction between the teeth forces the driving and driven members apart but remains effective to cause the teeth to re-engage periodically as the driving member continues to move.

2. The clutch of claim 1 in which the power means is a pneumatic actuator, which includes a cylinder forming part of the actuator, a piston arranged to operate in the cylinder with leakage of air past the piston and coupled to the output rod, and a throttle valve coupled to the piston and arranged to control the flow of fluid to the cylinder, the throttle valve being arranged so to control the flow of fluid to the cylinder that, during relative movement between the piston and the cylinder corresponding to relative movement of the clutch teeth from a position of initial engagement to a position of full engagement, the effort exerted by the actuator to urge the clutch members together progressively increases.

3. The clutch of claim 2, in which a leakage path is provided between the piston and the cylinder wall.

4. The clutch of claim 2, including a sealing device disposed at one end of the cylinder so arranged that the piston abuts against the sealing device at one limit of its travel to prevent the leakage of air past the piston.

5. The clutch of claim 2, including a second piston and cylinder, of smaller diameter than the first piston and cylinder, arranged to act together with the first piston and cylinder and to exert an effort over an initial part of the clutch engaging stroke of the actuator before the throttle valve is opened.

6. The clutch of claim 5, in which the second piston has a close fit with said second cylinder and is rigidly fixed to said first piston and serves to centre the first piston in its cylinder.

7. The clutch of claim 5, in which the wall of the second cylinder is formed with a port and the second piston is formed with a chamfered end part, the chamfered end part and the port being arranged to act in combination to serve as the throttle valve.

8. The clutch of claim 5, in which the first cylinder is formed with a wall length of enlarged diameter, the wall length being so disposed that the first piston occupies the said part during the said initial part of the clutch engaging stroke.

9. The clutch of claim 2, including a spring arranged to bias the piston relatively to the cylinder towards a position corresponding to a clutch open position.

10. The clutch of claim 2, including a pneumatic motor coupled to the driving clutch member and a motor control valve arranged also to control the flow of pressure fluid to the actuator.

11. The clutch of claim 10, including pneumatic operating means operatively coupled to the control valve and arranged for remote control.

12. The clutch of claim 10, including motor reversing valve gear arranged upon actuation to effect reversal of the direction of rotation of the pneumatic motor, coupling means coupling the motor reversing valve gear to the control valve, and biassing means arranged to bias the control valve to a closed position, the coupling means being so arranged that the control valve is opened upon the reversing gear being moved to the forward position or to the reverse position.

References Cited in the file of this patent

UNITED STATES PATENTS

| | | |
|---|---|---|
| 937,844 | McKeen | Oct. 26, 1909 |
| 1,862,362 | Hladik | June 7, 1932 |
| 2,352,140 | Trott | June 20, 1944 |
| 2,683,512 | Boice | July 13, 1954 |
| 2,700,143 | Boice | Jan. 25, 1955 |
| 2,739,585 | Paulavich | Mar. 27, 1956 |